United States Patent
Miyaji et al.

(10) Patent No.: US 6,263,081 B1
(45) Date of Patent: Jul. 17, 2001

(54) ELLIPTIC CURVE CALCULATION APPARATUS CAPABLE OF CALCULATING MULTIPLES AT HIGH SPEED

(75) Inventors: Atsuko Miyaji, Kawachinagano; Takatoshi Ono, Ama-gun, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/118,051

(22) Filed: Jul. 17, 1998

(30) Foreign Application Priority Data

Jul. 17, 1997 (JP) .................................................. 9-192143

(51) Int. Cl.$^7$ ...................................................... H04L 9/30
(52) U.S. Cl. .............................. 380/28; 380/30; 713/174; 708/492
(58) Field of Search ........................ 380/28, 30; 708/492; 713/174

(56) References Cited

U.S. PATENT DOCUMENTS

| | | |
|---|---|---|
| 4,641,264 | 2/1987 | Nitta et al. . |
| 5,406,628 | 4/1995 | Beller et al. . |
| 5,600,720 | 2/1997 | Iwamura et al. . |

FOREIGN PATENT DOCUMENTS

| | | | |
|---|---|---|---|
| 892 520 A2 | * 1/1999 | (EP) | ................................ H04L/9/30 |
| 8202263 | 2/1995 | (JP) . | |

OTHER PUBLICATIONS

Koblitz, A Course in Number theory and Cryptology, 2e, Chapter 6, 1994.*
Koblitz, Algebraic Aspects of Cryptography, Chapter 6, 1998.*
Koblitz, CM–Curves With Good Cryptographic Properties, Crypto 91, 1991.*
Solinas, An Improved Algorithm for Arithmetic on a Family of Ellptic Curves, Crypto 97, Aug. 1997.*
Bos et al. Addition Chain Heuristics, Crypto 89, 1989.*
Yacobi, Exponentiating Faster With Addition Chains, Eurocrypt 90, 1990.*
Lim, More Flexible Exponentiation With Precomputation, Crypto 94, 1994.*
Miyaji, On Secure and Fast Elliptic Curve Cryptosystems over Fp, Apr. 1994.*
Meier et al. Effcient Multiplication on Certain Nonsupersingular Elliptic Curves, Crypto 92, 1992.*
Koyama, et al. Speeding up Elliptic Cryptosystems by Using a Signed Binary Window Method, Crypto 94, 1994.*
Kazarin, Use of Properties of Elliptic Curves in Cryptographic Protocols, Avtomatika, vol. 26(5), pp. 23–32, 1992.*
Schneier, Applied Cryptography, 2e pp. 31–34, 185–186, 1994.*
"More Flexible Exponentiation with Precomputation" by C.H. Lim et al., Annual Int'l Cryptology Conference, Aug. 21, 1994.
"Efficient Elliptic Curve Exponentiation" by A. Miyaji et al., Information and Communications Security; 1$^{st}$ Int'l Conferences, ICICS/97, Computer Science vol. 1334, Jun. 1997, XP000865761.

(List continued on next page.)

*Primary Examiner*—Gilberto Barron, Jr.
*Assistant Examiner*—James Seal
(74) *Attorney, Agent, or Firm*—Price and Gess

(57) ABSTRACT

A fixed-point multiple calculation apparatus, for use in an encryption method and a signature method that use elliptic curves, finds multiples of a fixed point and an arbitrary point at high speed. The fixed-point multiple calculation apparatus generates a pre-computation tables for multiples of digits at one-word intervals and for multiples of digits at half-word intervals. Using the tables, multiples of points on an elliptic curve are calculated using a doubling process, but with a reduced number of additions. This reduces the overall amount of required calculation.

18 Claims, 13 Drawing Sheets

COEFFICIENT SERIES AFTER TRANSFORMATION

DIVISION INTO WINDOWS

OTHER PUBLICATIONS

Information and Communications . . . , Online! XP0002151211. This document establishes the publication date of XP000865761.

"Public–Key Cryptosystem with Very Small Key Lengths" by G. Harper et al., Int'l Conference on the Theory and Application of Cryptographic Technology, May 24, 1992.

"Message Recovery for Signature Schemes Based on the Discrete Logarithm Problem," by K. Nyberg et al., 1996.

37 Fast Exponentiation with Precomputation (Extended Abstract), by E. Brickel, 1992.

* cited by examiner

FIG. 5

TABLE STORAGE UNIT

| | S | A[s] | B[s] |
|---|---|---|---|
| 1 | 00000 | $A[00000] = \infty$ | $B[00000] = \infty$ |
| 2 | 00001 | $A[00001] = G$ | $B[00001] = 2^{16}G$ |
| 3 | 00010 | $A[00010] = 2^{32}G$ | $B[00010] = 2^{32+16}G$ |
| 4 | 00011 | $A[00011] = 2^{32}G + G$ | $B[00011] = 2^{32+16}G + 2^{16}G$ |
| ⋮ | | ⋮ | ⋮ |
| 32 | 11111 | $A[11111] = 2^{128}G + 2^{96}G + 2^{64}G + 2^{32}G + G$ | |

COEFFICIENT SERIES AFTER TRANSFORMATION

T = 1 0 0 1 1 1 1 0 0 0 $\bar{1}$ 0 $\bar{1}$ 0 0 1 0 0 0 $\bar{1}$ $\bar{1}$ 0 $\bar{1}$ 0 0 1 0 1

DIVISION INTO WINDOWS

FIG. 11

TABLE IN THE TABLE GENERATION UNIT

| S | $SY_a$ |
|---|---|
| 3 | $3 * Y_a$ |
| 5 | $5 * Y_a$ |
| 7 | $7 * Y_a$ |
| ⋅ | ⋅ |
| ⋅ | ⋅ |
| ⋅ | ⋅ |
| 15 | $15 * Y_a$ |

ELLIPTIC CURVE CALCULATION APPARATUS CAPABLE OF CALCULATING MULTIPLES AT HIGH SPEED

BACKGROUND OF THE INVENTION (1) Field of the Invention

The present invention relates to an encryption technique for maintaining the security of information, and in particular relates to a multiplication apparatus that performs the necessary calculation for encryption and digital signature techniques which use an elliptic curve (2) Prior Art Secret communication techniques allow communication to be performed without the content being revealed to third parties. Digital signature techniques, meanwhile, enable a receiver to verify the validity of the communicated content by confirming that the information is from the stated sender. Such signature techniques use an encryption technique called public key encryption.

Public key encryption provides a convenient method for managing the separate encryption keys of many users, and so has become a fundamental technique for performing communication with a large number of users. In brief, public key techniques use different keys for encryption and decryption, with the decryption key being kept secret and the encryption key being made public. Here, one of the founding principles for the security of public key encryption is the so-called "discrete logarithmic problem". Representative examples of the discrete logarithmic problem are problems defined over finite fields and problems based on elliptic curves. Such problems are described in detail in Neal Koblitz, *A Course in Number Theory and Cryptography* (Spinger-Verlag, 1987). A discrete logarithmic problem based on an elliptic curve is explained below.

The elliptic curve logarithmic problem is as follows. (E(GF(p))) is the elliptic curve E defined in the finite field GF(p), with the element G, given by dividing the order of E by a large prime number, being set as a base point. This being so, the problem is to find an integer x that satisfies the relationship $$Y = xG$$

where the element Y is also given by the elliptic curve E and such value x actually exists.

The reason a discrete logarithmic problem assists in the security of public key encryption is that the above calculation is extremely difficult for a large finite field GF(p), with such calculation corresponding to the calculation of the inverse, or "hard direction", of a one-way function.

The following is a description of the Elsamal signature technique which uses a discrete logarithmic problem based on an elliptic curve.

FIG. 13 shows a conventional configuration for the ElGamal signature algorithm based on an elliptic curve. This procedure is described in detail below.

(1) Settings by the Center

First, a prime number is set as p, an elliptic curve on the finite field GF(p) is set as E, and an element with the order q of E(GF(p)) is set as G. The public key of user A is set as $Y_a = x_a G$, while the secret key of user A is set as $x_a$. The center announces the prime number p, the elliptic curve E and the base point G as system parameters, and A informs other users of his public key $Y_a$.

(42) Signature Generation

1. Random number k generated.
2. $R_1 = kG = (r_x, r_y)$ and $s = m + r_x * x_a / k \pmod{q}$ calculated.
3. $(R_1, s)$ transmitted together with message m as signature.

(3) Signature Verification

Check to see whether $sR_1 = mG + r_x Y_a$ is satisfied.

As can be seen from the above example, a signature technique based on an elliptic curve requires the calculation of the total of kG that is a "multiple" of the fixed point G and $r_x Y_a$ which is a multiple of the arbitrary point P (which in the above conventional example corresponds to the public key $Y_a$). Two conventional methods for performing these calculations are described below.

The first method calculates a multiple of the fixed point G, and is described in detail in E. F. Brickell, D. M. Gordon, K. S. McCurley and D. B. Wilson, *Fast Exponentiation with Precomputation* (Advances in Cryptology-Proceedings of Eurocrypt '92, Lecture Notes in Computer Science, 1993, Springer-Verlag, pages 200–207).

First Conventional Method

The following is a simplified explanation of this first conventional method.

A 160-bit prime number is set as p, an elliptic curve on the finite field GF(p) is set as E. G and kG, which are elements of E(GF(p)), are calculated.

Step 1—Generation of Pre-Computation Table

A provisional calculation table is generated by calculating $G_i = (16^i)G$ (where i=1, . . . ,40)

Step 2—Calculation of kG

A 160-bit positive integer k is expressed as $$k = k_0 + k_1 * 16 + k_2 * 16^2 + \ldots + k_{40} * 16^{40}$$

(where $-7 \leq k_0, \ldots, k_{40} \leq 8$)

kG is calculated by the following routine.
(Step 2-1)
$B = A = \Sigma \text{sign}(k_i) G_i$ (total for i where $k_i = 8$)
(Step 2-2)
d=7
(Step 2-3)
The following processing is performed while $d \geq 1$.
$A = A + \Sigma \text{sign}(k_i) G_i$ (total for i where $k_i = \pm d$)
$B = B + A$
$d = d - 1$
Return to Step 2-3
In this case kG is found as B=kG.

In the above method, a calculation which doubles a provisional total is not necessary, so that the procedure can be achieved through addition alone, although this means in that 44 calculations are required. Since there are cases where these additions are more time-consuming than when doubling is performed, the above procedure is not especially efficient.

A method for calculating exponential powers of an arbitrary point $Y_a$ on an elliptic curve is described in Koyama, Tsuruoka, *Speeding up Elliptic Cryptosystems by Using a Signed Binary Window Method*, Advances in Cryptology-Proceedings of Crypto'92, Lecture Notes in Computer Science, 1993, Springer-Verlag, pages 345–357. This is explained in detail below.

Second Conventional Method

The following is a simplified explanation of this second conventional method.

A 160-bit prime number is set as p, an elliptic curve on the finite field GF(p) is set as E, and the elements P and kP of the curve E(GF(p)) are calculated.

This prime number p is expressed in binary as $$k = k_0 + k_1 + 2 + k_2 \cdot 2^2 + \ldots + k_{159} \cdot 2^{159} = [k_{159} \ldots k_2 k_1 k_0]$$

(where $k_0, \ldots, k_{159} = 0,1$)
(Step 1)

This binary number is transformed into an addition-subtraction expression.

A bit sequence B which forms part of k is found from the lower-order $k_i$ bit $$B = [1, \ldots, b_i, \ldots, 1]$$

When $\#B_1 - \#B_0 \geq 3$, the bit sequence is transformed into T(B) as shown below.

$$T(B) = [1, 0, \ldots, t_i, \ldots, -1], t_i = b_i - 1$$

Here, $\#B_1$ and $\#B_0$ respectively express the number of "1" values and "0" values included in the partial bit sequence B. After transformation, k becomes T.

(Step 2—Division into Windows)

The value T is expressed as $T = [t_{160}, \ldots, t_2, t_1, t_0]$ and the value T is scanned starting from the MSB (Most Significant Bit).

The bits are analyzed in order towards the LSB (Least Significant Bit) starting from the first bit with the value "1", with the bit sequence being divided just before the first bit with the value "0" to appear within the following four bits. If no "0" value appears in the following four bits, these four bits are set as a window.

(Step 3—Pre-Computation Table Generated)

Values of sP where $(s = 3, 5, \ldots, 15)$ are calculated and are set as the pre-computation table.

(Step 4—kP Calculated)

T is analyzed starting from the MSB, and a value in the pre-computation table is added for each window in turn. After each addition, the result is multiplied by a power of two.

In this conventional example, however, there are many windows, meaning that a large number of additions need to be performed in Step 4. As a result, this calculation is as inefficient as the previous method of finding a multiple of a fixed point value.

SUMMARY OF THE INVENTION

It is a primary object of the present invention to provide a calculation apparatus that can efficiently calculate a multiple of a fixed point and a multiple of an arbitrary point which are required by encryption methods and signature methods that use elliptic curves.

This primary object can be achieved by an elliptic curve calculation apparatus for calculating a multiple kG, p and q being prime numbers, E(GF(p)) being an elliptic curve over a finite field GF(p), G being a base point which is an element with an order q in E(GF(p)), p being t words long, and k being a positive integer whose number of digits is no less than n words (where $n \geq 1$), the elliptic curve calculation apparatus including; a first table for storing multiples of the base point G and figures produced by combining digits located at one-word intervals in a binary number with the same number of digits as k; a second table for storing multiples of the base point G and figures produced by combining digits located at one-word intervals in the binary number, the second table storing multiples of different combinations of digits in the binary number to the first table; and a calculation unit for calculating the multiple kG of the base point G by repeating a process where multiples stored in the first table and the second table are added and multiplied by two.

Here, the multiples stored in the first table may be for digits in the integer k that are located ½ word from the digits in the integer k whose multiples are stored in the second table.

Here, the calculation unit may include a first address generating unit and a second address generating unit, the first and second address generating units receiving a new positive integer k from the calculation unit, referring to a sequence of digits in the integer k and generating an address for referring to the first table and the second table, respectively.

Here, the first and second address generating units may detect digits located at word intervals in the integer k and generate addresses from the detected digits, the first address generating unit detecting digits in the integer k that are located ½ word from the digits detected by the second address generating unit.

Here, the first address generating unit may detect a first combination of digits at word intervals which include a most significant bit of integer k, the first address generating unit thereafter detecting a combination of digits which are shifted by one each time and finally detecting a combination of digits which are located just before halfway points of the word unit.

Here, the calculation unit may also include a reading unit, the reading unit using the addresses generated by the first address generating unit and the second address generating unit to refer to the first table and the second table, and reading values stored at the generated addresses, and the calculation unit may repeatedly perform: a first calculation that finds a total of a stored value in the first table and a stored value in the second table that have been read by the reading unit; a second calculation that doubles a calculation result of the first calculation; and a a third calculation that adds a calculation result of the second calculation to a calculation result of the first calculation for stored values that have been newly read by the reading unit from the first table and the second table, where the values in the first and second tables, the positive integer k, and the base point G are all expressed in binary.

The stated object can also be achieved by a communication terminal that performs public key encryption with another communication terminal, the communication terminal being connected to a center via a network and including a random number generation unit for generating a random number k and an elliptic curve calculation apparatus for calculating a multiple kG of an element G, where a prime number p, an elliptic curve E(GF(p)) over a finite field GF(p), the element G with order q of E(GFp)), and a public key $Y_a$ are revealed by the center as system parameters, the elliptic curve calculation apparatus including: a first table for storing multiples of the base point G and figures produced by combining digits located at one-word intervals in a binary number with the same number of digits as k; a second table for storing multiples of the base point G and figures produced by combining digits located at one-word intervals in the binary number, the second table storing multiples of different combinations of digits in the binary number to the first table; and a calculation unit for calculating the multiple kG of the base point G by repeating a process where multiples stored in the first table and the second table are added and multiplied by two.

The stated object can also be achieved by an elliptic curve calculation apparatus for calculating a multiple kG, p and q being prime numbers, E(GFPp)) being an elliptic curve in a finite field GF(p), G being a base point which is an element in an order q of E(GF(p)), p being t words long, and k being a positive integer whose number of digits is no less than n words (where $n \geq 1$), the elliptic curve calculation apparatus including: a table for storing multiples of the base point G and figures produced by combining digits located at word intervals in a binary number with the same number of digits as the integer k; a referencing unit for referring to the integer k and generating an address for indexing the table; a first calculation unit for reading a first value from the table using the generated address and for multiplying the read first value by a power of two, wherein the power of two equates to a number of digits in half a word; a second calculation unit for finding a sum of a second value that is a calculation result of the first calculation unit and a third value read from the table using an address newly generated by the referencing unit; a third calculation unit for multiplying a calculation result of the second calculation unit by a power of two, the power of two depending on a digit position within the integer k; and a control unit for having the first to third calculation units repeatedly perform calculation until every digit in the integer k has been used in calculation, where the integer k and the element G are both binary numbers.

The stated object can also be achieved by an elliptic curve calculation apparatus for calculating a multiple kP of an arbitrary point P on an elliptic curve G, p and q being prime numbers, E(GF(p)) being an elliptic curve in a finite field GF(p), G being a base point which is an element in an order q of E(GF(p)), p being n bits long, and k being a positive prime number whose number of digits is large, the elliptic curve calculation apparatus calculating the multiple kP of the arbitrary point P using a combination of an addition-subtraction transformation method and a window method, and the elliptic curve calculation apparatus including: a coefficient detecting unit for analyzing, when the positive integer k is expressed in binary as $k=k_0+k_1*2+k_2*2^2+\ldots+k_{n-1}2^{n-1}$ (where $k_0 \ldots k_{n-1}=0$ or 1), every bit in the positive integer k starting from a least significant bit and extracting each bit where $k_i=1$; a coefficient transforming unit for analyzing, when a bit where $k_i=1$ has been extracted and a coefficient $k_{(i+m)}$ for an (i+m) bit has a value "1", higher coefficients starting from an (i+m+1) bit and, on finding a bit <a where $k_s=0$, generating transformed values $t_s=1, t_{s-1}=0, \ldots t_{(i+m+1)}=0$ where coefficients $k_{(i+m+1)}$ to $k_s$ are inverted; a surplus adjustment unit for adjusting, when the coefficients between the a bit and the i+m+1 bit have been transformed by the coefficient transformation unit, a surplus added when the coefficients between the s bit and the i+m+1 bit were transformed, thereby converting $k_i$ to $k_{(i+m+1)}$ into transformed values $t_i$ to $t_{(i+m)}$; value maintaining unit for setting, when a bit where $k_i=1$ has been extracted and $k_{(i+m)}$ has a value "0", $k_i\sim k_{i+m}$ as transformed values $t_i\sim t_{i+m}$ without amendment: and repetition indicating unit for having the coefficient detecting unit perform a detecting operation (1) for higher bits starting from an s+1 bit when the surplus adjustment unit has adjusted a surplus and (2) for higher bits starting from an i+m+1 bit when the value maintaining unit has set $k_i\sim k_{i+m}$ as $t_i\sim t_{i+m}$, before in either case activating every unit in the elliptic curve calculation apparatus.

Here, m is equal to the number of bits in one window and for the purpose of this discussion m=4 although other values may be used.

The stated object can also be achieved by an elliptic curve calculation apparatus for calculating a multiple kP of an arbitrary point P on an elliptic curve G, p and q being prime numbers, E(GF(p)) being an elliptic curve in a finite field GP(p), G being a base point which is an element in an order q of E(GF(p)), p being n bits long, and k being a positive prime number whose number of digits is large, the elliptic curve calculation apparatus including: an addition-substitution transformation unit for analyzing, when the positive integer k is expressed in binary as $k=k_0+k_1*2+k_2*2^2+\ldots+k_{n-1}2^{n-1}$ (where $k_0 \ldots k_{n-1}=0$ or 1), every bit in the positive integer k starting from a least significant bit and, when a bit where $k_i=1$ has been extracted and a coefficient $k_{(i+m)}$ for an (i+m) bit (m being a positive integer) has a value "1", analyzing higher coefficients starting from an (i+m+1) bit and, on finding a bit s where $k_s=0$, generating transformed values $t_s=1, t_{s-1}=0, \ldots t_{(i+m+1)}=0$ where coefficients $k_{(i+m+1)}$ to ks are inverted, while adjusting a surplus value added when the coefficients between the s bit and the i+m+1 bit were transformed to produce transformed values $t_1$ to $t_{(i+m)}$ from $k_i$ to $k_{(i+m)}$; a window dividing unit for dividing, after all bits in the positive integer k have been subjected to transformation by the addition-substitution transformation unit to produce a transformed numerical string, the transformed numerical string into m-bit windows; a provisional calculation table storing multiples of s (where $s=3,5, \ldots (2m-1)$) and the arbitrary point P; and a multiplying unit for searching the provisional calculation table using a binary number in a window to obtain a value sp, for adding the value sp to a provisional total $S_a$, and for multiplying the provisional total $S_a$ by an appropriate power of two before adding a next value sp, wherein the multiple kP of the arbitrary point P is found as the provisional total $S_a$ when every window has been processed by the multiplying unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows the detailed composition of the table storage unit shown in FIG. 3;

Figure 4:
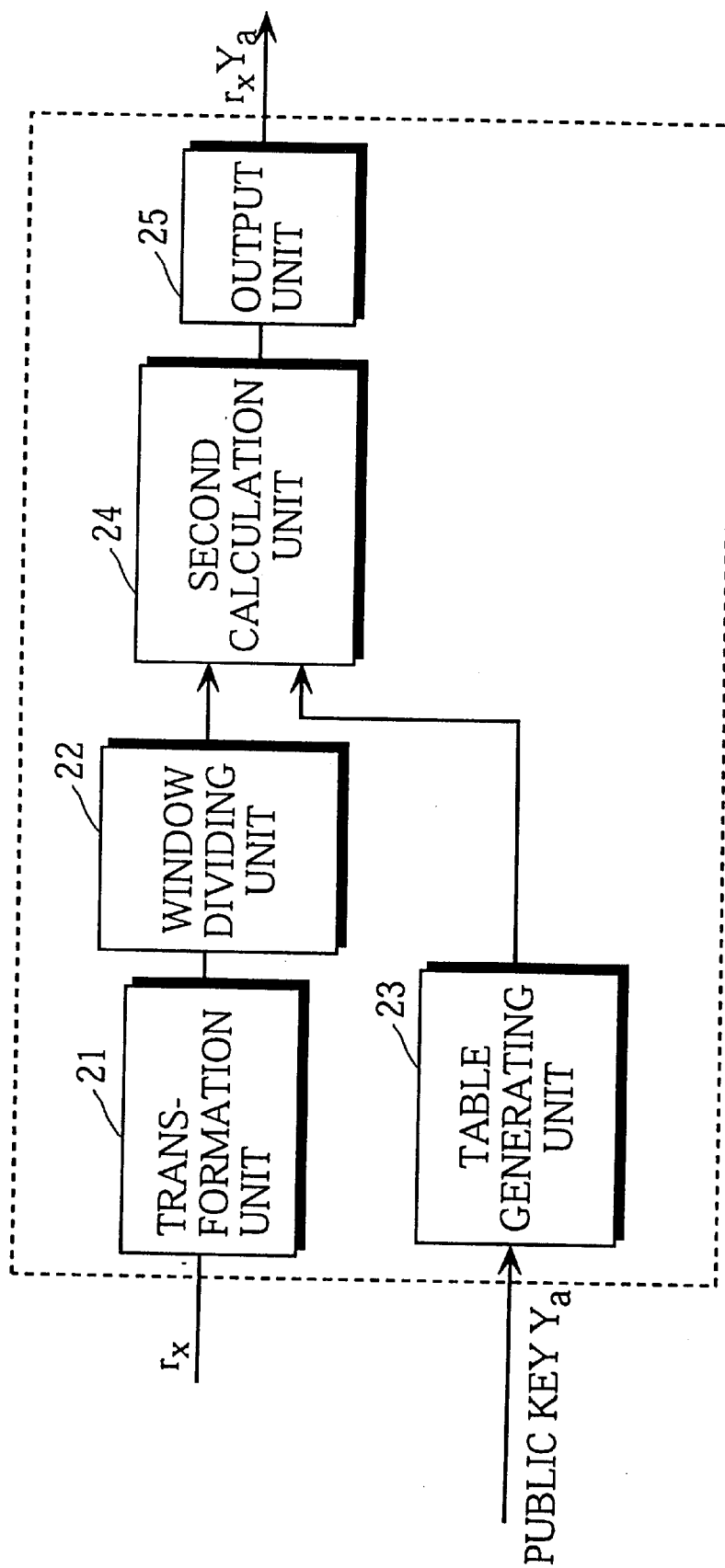
FIG. 4 shows a calculation apparatus for finding a multiple of an arbitrary value, as a different example of the present invention.
Figure 10:
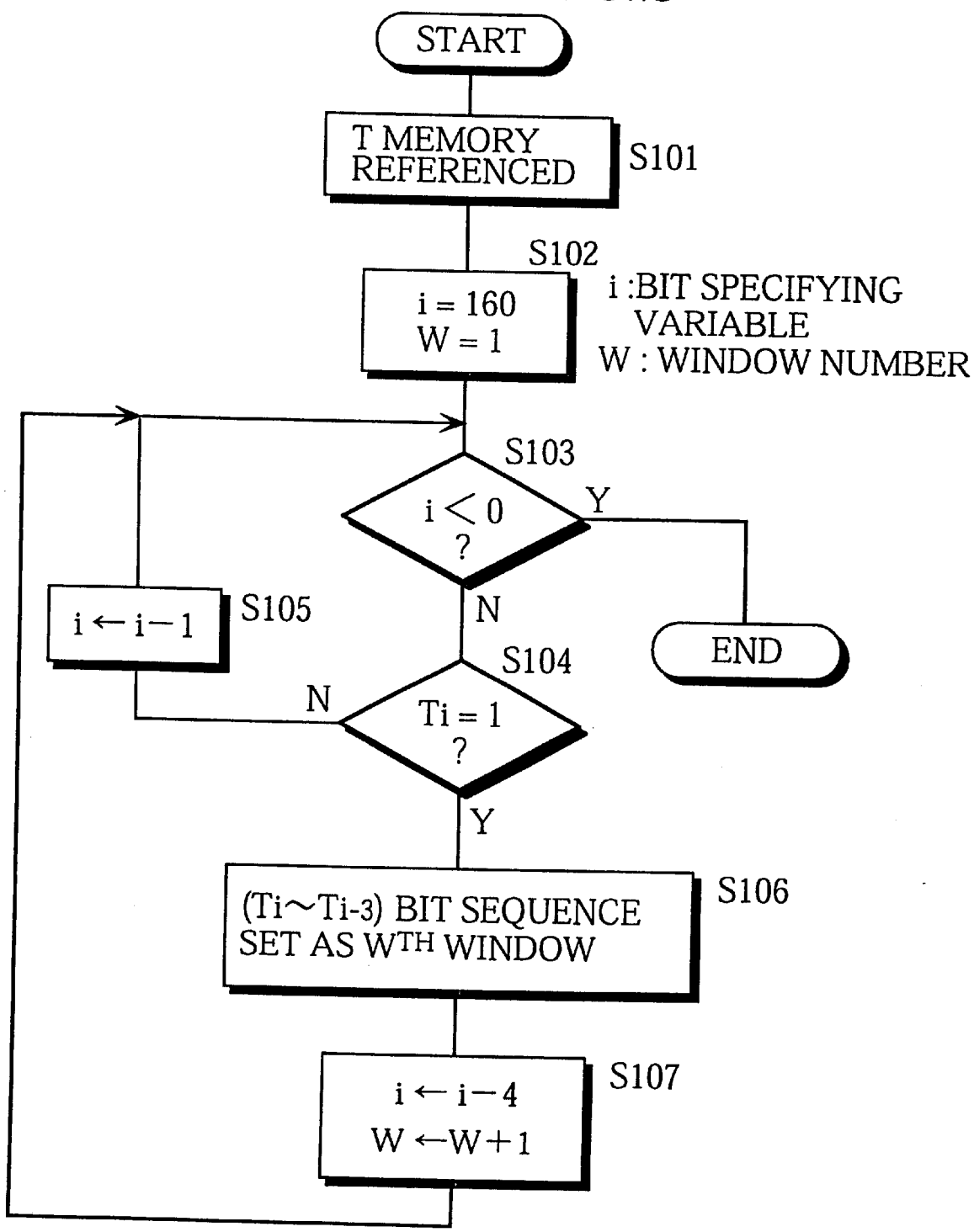

at FIG. 10 is a flowchart showing the processing of the window dividing unit shown in FIG. 4;

FIG. 11 shows a table that is generated by the table generation unit shown in FIG. 4.

Figure 12:
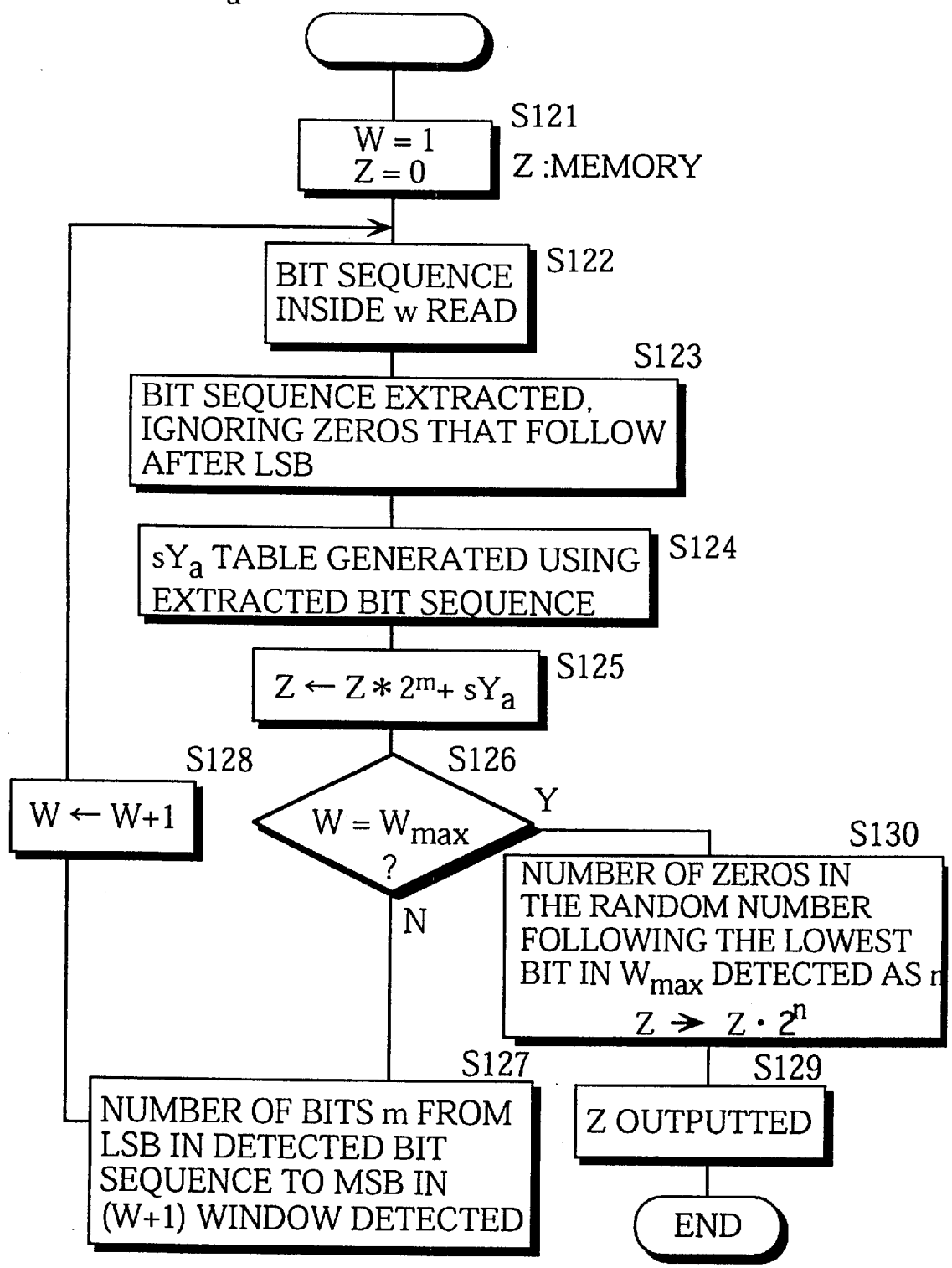
Figure 13:
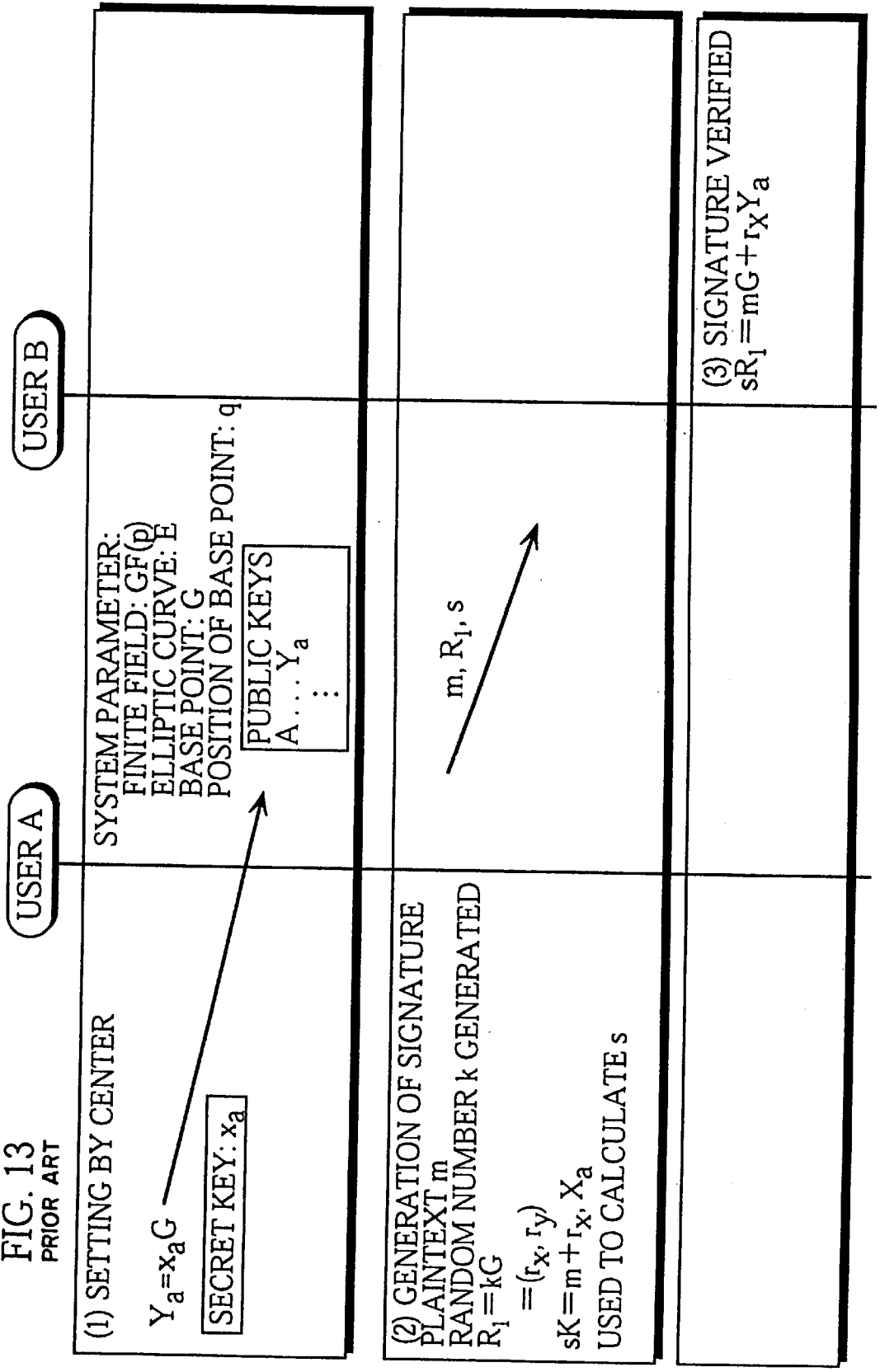

FIG. 12 is a flowchart showing the calculation operation of the second calculation unit in FIG. 4, and FIG. 13 shows the method used when communicating an ElGamal signature.

PREFERRED EMBODIMENTS OF THE INVENTION

Figure 1:
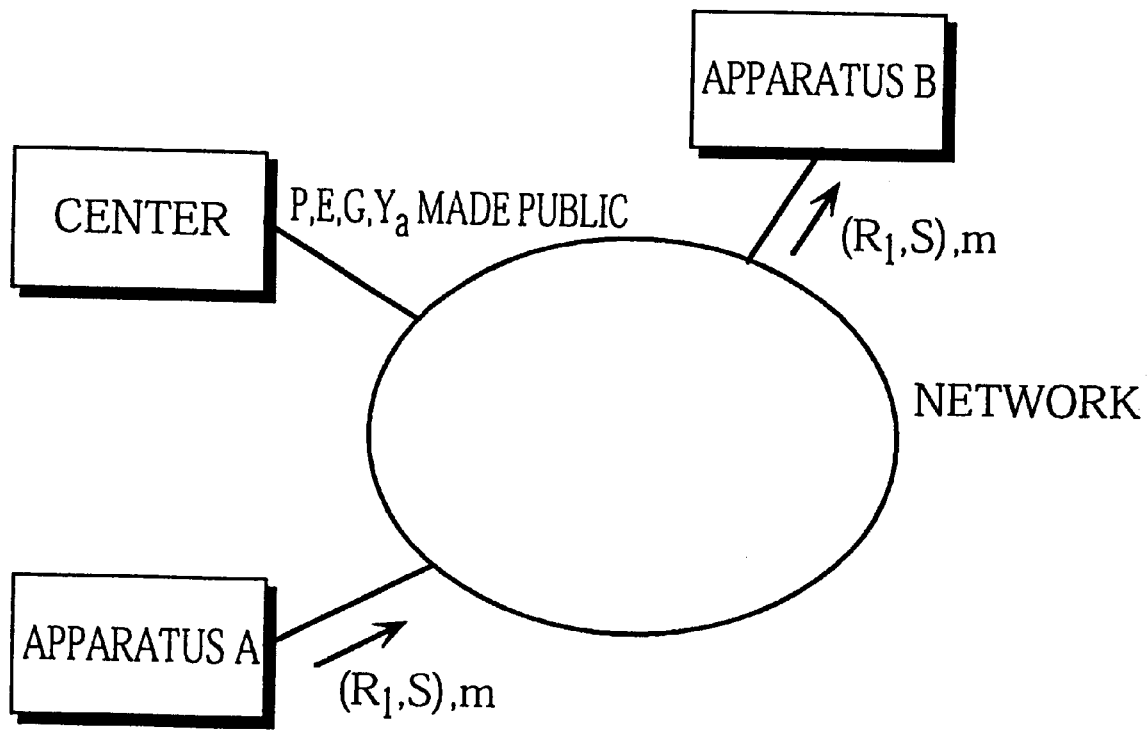
FIG. 1 shows an example of a communications system to which the present invention is to be applied.

FIG. 1 shows a communications system to which the present invention can be applied. Apparatuses A and B, which are to perform signed communication on a ring network, for example, are connected to a center.

Figure 2:
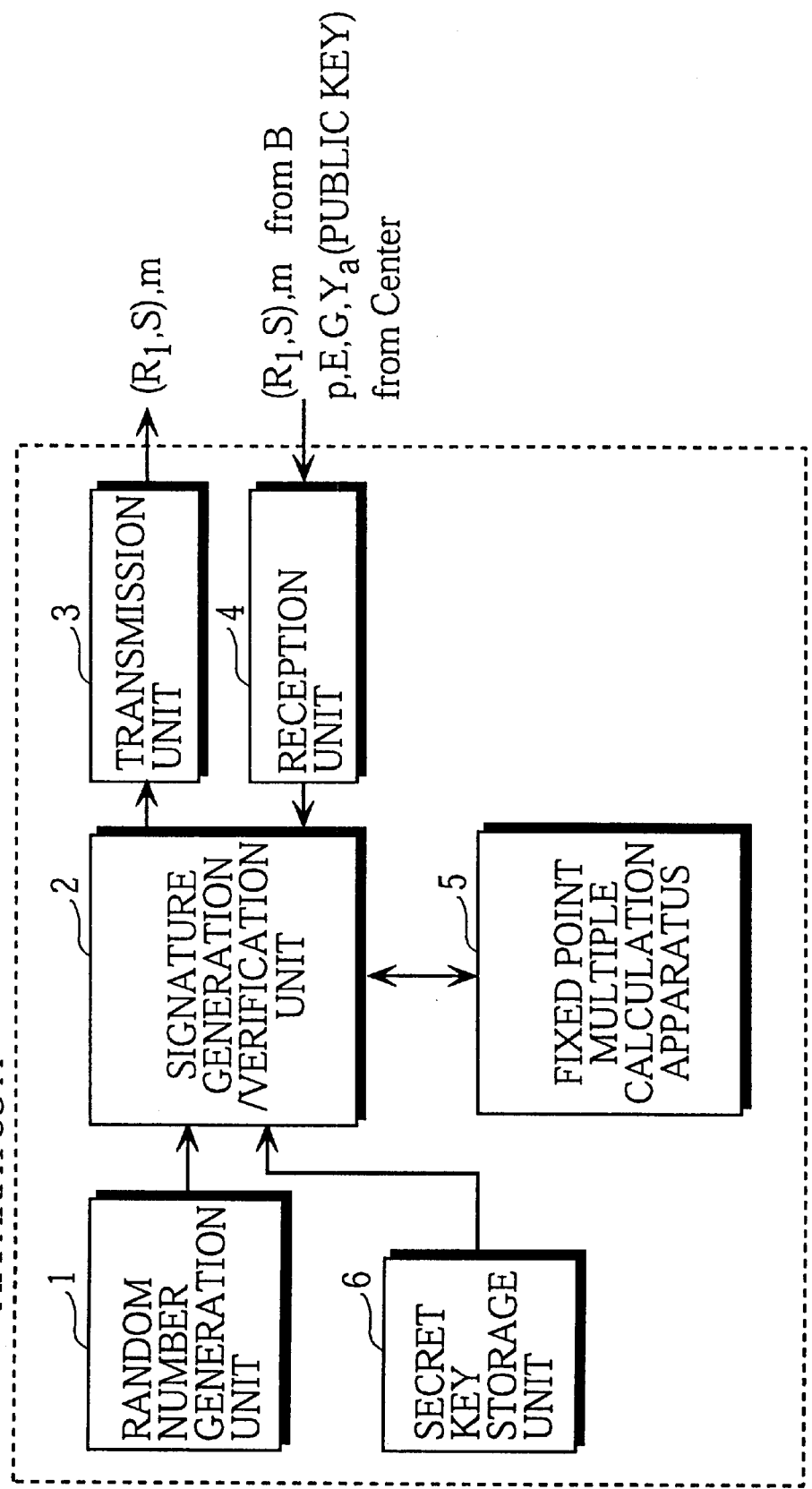
FIG. 2 is a block diagram showing a communication apparatus for performing the ElGamal signature technique.

FIG. 2 is a block diagram showing the configuration of apparatus A for performing ElGamal signed communication. As shown in FIG. 2, apparatus A is composed of a random number generation unit 1, a signature generation/verification unit 2, a transmission unit 3, a reception unit 4, a fixed point multiple calculation apparatus 5, and a secret key storage unit 6.

The ElGamal signature technique is performed as described below, with this procedure also having been mentioned in the prior art section. First, the center announces the prime number p, the elliptic curve E, and the base point G as the system parameters, while the apparatus A announces its public key $Y_a$. Next, the transmitter A who wishes to perform signed communication generates a signature using a random number produced by itself and the system parameters obtained from the center. The apparatus A transmits the signature together with a message to the receiver B. The receiver B performs a predetermined calculation using the received signature and message to verify that the signature is genuine. If the signature is genuine, the receiver B can then confirm that the received message is really from the transmitter A.

When signed communication is to be performed, the random number generation unit 1 of the apparatus A generates the random number k. Any number of digits may be used for this random number k, with, for example, the same number of digits as the system parameter p received from the center being used. This is to say, if the system parameter p is 160 bits long, the generated random number k will also be 160 bits long. Circuits for generating random numbers are well known, and so will not be described here.

The fixed point multiple calculation apparatus 5 uses the random number k generated by the random number generation unit 1 and the base point G, included in the system parameters received from the center via the reception unit 4 to perform the following calculation.

$$R = kG = (r_x, r_y)$$

In this equation, G is a fixed point, so that this equation is called a fixed point multiple calculation. The fixed point multiple calculation apparatus 5 will be described in more detail later in this specification.

The signature generation/verification unit 2 generates a signature when the apparatus A is the transmitter in the signed communication, and performs signature verification when the apparatus A is the receiver. When generating a signature, the signature generation/verification unit 2 uses the calculation result $R_1$ of the fixed point multiple calculation apparatus 5, the secret key $x_a$ stored by the secret key storage unit 6, the message m, and the prime number order q to calculate the following equation.

$$s = (m + r_x x_a)/k \pmod{q} \quad (1)$$

On the other hand, when verifying a signature, the signature generation/verification unit 2 uses the signature $(R_1, s)$ received from another apparatus via its transmission unit 3, the message a, and the system parameters received from the center to check whether the following relationship is satisfied.

$$sR_1 = mG + r_x Y_a \quad (2)$$

The above calculations performed by the signature generation/verification unit 2 are composed of multiplication/divisions and additions which may be performed by hardware or software. However, in the above calculations, the multiplication ($r_x Y_a$) uses a different public key $Y_a$ depending on the other device-in-communication, making this calculation equate to the multiplication of an arbitrary point. This calculation can be performed somewhat more efficiently than in the prior art. The detailed configuration of this signature generation/verification unit 2 is shown in FIG. 4, and is described in detail later in this specification.

Calculation of a Multiple for a Fixed Point

Figure 3:
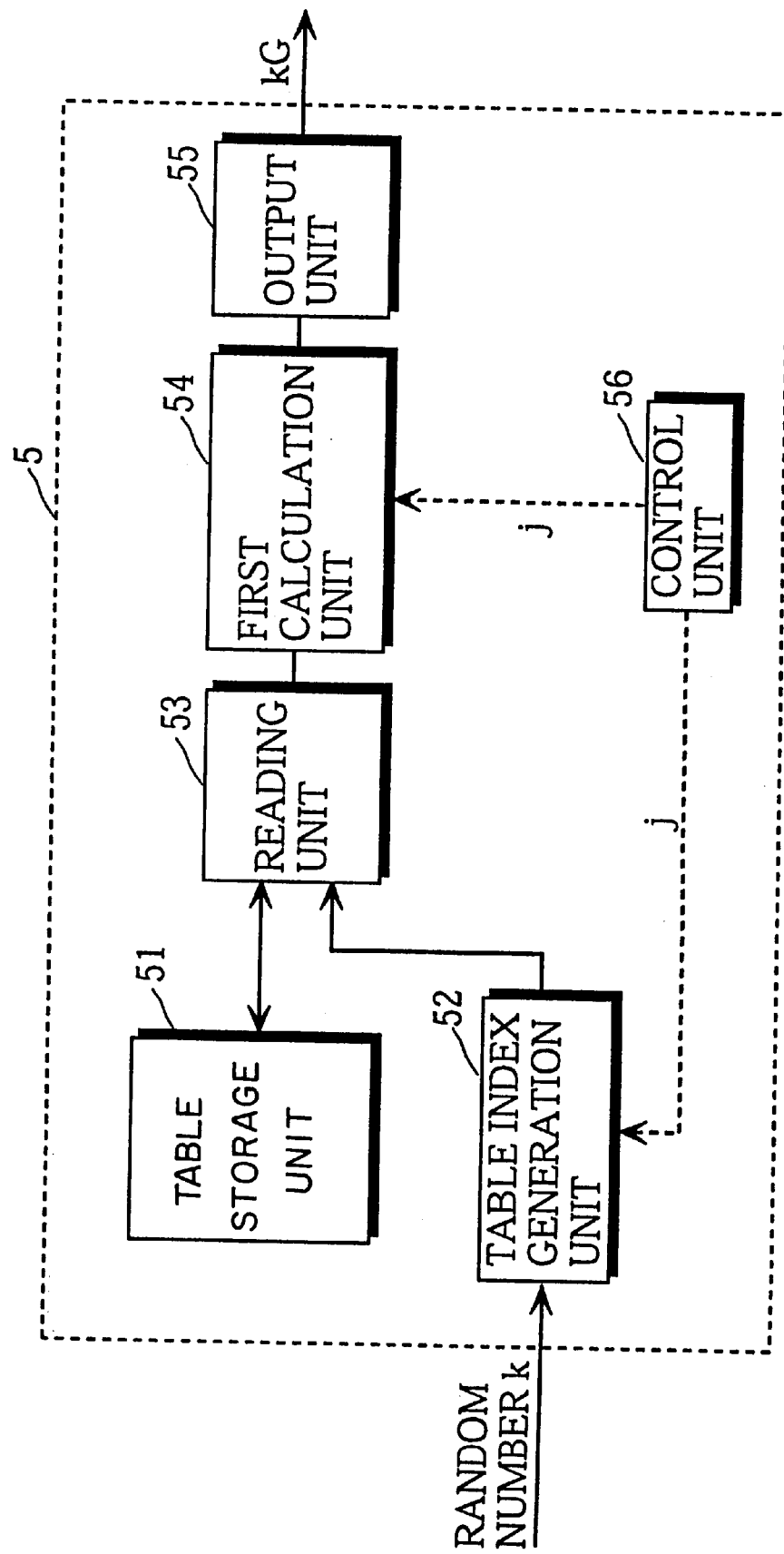
FIG. 3 is a block diagram showing a fixed point multiple calculation apparatus for finding a multiple of a fixed point as an example of the present invention.

FIG. 3 is a block diagram showing the detailed configuration of the fixed point multiple calculation apparatus 5. As shown in FIG. 3, the fixed point multiple calculation apparatus 5 is composed of a table storage unit 51, a table index generation unit 52, a reading unit 53, a first calculation unit 54, an output unit 55, and a control unit 56.

The calculation principles of the fixed point multiple calculation apparatus 5 will be explained before the fl configuration of the various components of the present apparatus.

As its name suggests, the fixed point multiple calculation apparatus 5 finds a multiple kG of a fixed point G. When the random number k is expressed as a 160-digit binary number, k can be given by the standard expression below.

$$k = k_0 * 2^0 + k_1 * 2^1 + k_2 * 2^2 + \ldots + k_{159} * 2^{159} \text{(where } k_0, k_1, k_2 \ldots k_{159} = 0 \text{ or } 1) \quad (3)$$

The multiple of a fixed point can be found as the total of separately multiplying G by the value represented by each element in the above equation, although this involves a large amount of calculation and will take a long time. As an alternative, if a correspondence table is generated where coefficients $k_i$ at 32-bit intervals are associated with a result of finding a multiple of G for a total of a binary number whose digits are at 32-bit intervals, the multiplication result for a group of coefficients $k_i$ at 32-bit intervals can be obtained simply by referring to the correspondence table. If this process is repeatedly performed with the combination of coefficients $k_i$ being shifted by one each time until there are no more coefficients, a total value can be obtained. When doing so with a single correspondence table, the referencing and multiplication for the correspondence table needs to be repeated 32 times, although when two correspondence tables are used, this may be halved to 16 times, making the processing more efficient. This is the fundamental principle for the calculation of a multiple of a fixed point in the present embodiment.

The following is a description of the configuration of each component in the fixed point multiple calculation apparatus 5, based on these principles.

Configuration of the Table Storage Unit

FIG. 5 shows the stored content of the table storage unit 51. In this figure, s is a sequence which shows a combination of coefficients $k_i$ at 32-bit intervals. The random number k is composed of 160 bits, so that there are five coefficients $k_i$ at 32-bit intervals. As a result, s can be seen to be a 5-bit sequence. It should be noted here that the arrangement of the bits in the sequence s is such that the highest bit in a matches the highest coefficient in the random number. Since each coefficient $k_i$ can be "0" or "1", there are a total of $2^5(=32)$ patterns from "00000" to "11111" for the sequence s. It should be obvious that after generating the random number k, each coefficient $k_i$ is unequivocally determined, and since it is necessary to find totals for combinations of coefficients $k_i$ at 32-bit intervals regardless of the value generated as the random number, this means that a total of $2^5(=32)$ patterns from "00000" to "11111" need to be prepared for the sequence s. For this reason, values from "00000" to "11111" are shown for the sequence s. As should be clear from the above explanation, the sequence s can cover all possibilities for the combinations of coefficients $k_i$ of the random number k, while not being the group of combination of coefficients $k_i$ themselves. This is shown by the following equation.

$$s=[a_4a_3a_2a_1a_0] \text{ (where } a_0 \text{ to } a_4=0 \text{ or } 1) \quad (4)$$

Here, the notation $[a_4a_3a_2a_1a_0]$ simply represents a sequence of "0"s and "1"s.

The notation A(s) represents a value obtained as a multiple of the base point G for a value given by the lowest bit $k_0*2^0$ of the random number k and the values of the higher bits given in 32-bit intervals (which is to say $k_{32}*2^{32}$, $k_{64}*2^{64}$, $k_{96}*2^{96}$, $k_{128}*2^{128}$). When doing so, A(s) needs to be prepared for all 32 possible patterns of $[a_4a_3a_2a_1a_0]$. As one example, when s is "00001", only the lowest coefficient $k_0$ of the lowest bit is 1, so that A(s) is equal to G itself. When s is "00010", only the coefficient $k_{32}$ which is 32 bits higher than the lowest bit is 1, meaning that A(s) is equal to $2^{32}*G$. Similarly, when s is "00011", $k_0$ and $k_{32}$ are 1, meaning that A(s) is equal to $2^{32}*G+G$. Equation (5) below is the general formula for calculating A(s).

$$A(s)=a_0*G+a_1 2^{32}*G+a_2 2^{(32*2)}*G+a_3 2^{(32*3)}*G+a_4 2^{(32*4)}*G \quad (5)$$

On the other hand, the notation B(s) represents a value obtained as a multiple of the base point G for a value given by the values of the coefficients of the value k given in 32-bit intervals starting from the $16^{th}$ bit from the LSB (Least Significant Bit), which is to say $k_{16}*2^{16}$, $k_{(16+32)}*2^{(16+32)}$, $k_{(16+64)}*2^{(16+64)}$, $k_{(16+96)}*2^{(16+96)}$, $k_{(16+128)}*2^{(16+129)}$. This can be said to be a value of A(s) for the same sequence s which has been shifted 16 bits towards the MSB. The reason this shift is performed by 16 bits is that the sequence s relates to 32 bit groupings of the coefficients $k_i$, and that the value 16 is exactly half of 32. As a result, the number of repeated cycles performed for the calculation of the multiple k*G of a fixed point can be reduced to 16. Equation (6) below is the general formula for calculating B(s).

$$B(s) = a_0 * 2^{16} * G + a_1 * 2^{(16+32)} * G + a_2 * 2^{(16+32*2)} * G + \\ a_3 * 2^{(16+32*3)} * G + a_3 * 2^{(16+32*4)} * G \quad (6)$$

Table Index Generation Unit

The table index generation unit 52 temporarily stores the random number k whenever it is generated, and detects coefficients in the random number k located at 32-bit intervals. Since the random number k is a 160-bit value as shown by Equation (3), there are the following 32 patterns of coefficients taken at 32-bit intervals.

(0) $[k_{128},k_{96},k_{64},k_{32},k_0]$
(1) $[k_{129},k_{97},k_{65},k_{33},k_1]$
(2) $[k_{130},k_{98},k_{66},k_{34},k_2]$
(j) $[k_{(128+j)},k_{(96+j)},k_{(64+j)},k_{(32+j)},k_j]$
(31) $[k_{159}, k_{127}, k_{95}, k_{63}, k_{31}]$

The table index generation unit 52 generates respective index addresses (the combinations of coefficients given above) for indexing each of A(s) and B(s) for each of the 16 repetitions (hereinafter, "cycles"). The order for this generation is decided according to the coefficient j ($0 \leq j \leq 15$) indicated by the control unit 56. In the first cycle, the combinations (15) and (31) of the coefficients $k_i$ are outputted, with these being decreased by one in each cycle until finally (0) and (16) are outputted.

When the index address generated by the table index generation unit 52 for seeking A(s) is set at $U_j$ and the index address for seeking B(s) is set at $V_j$, A(s) and B(s) can be found according to the following Equations (7) and (8).

$$U_j = \sum_{i=0}^{4} k_{(32*i+j)} * 2^i \quad (7)$$

$$V_j = \sum_{i=0}^{4} k_{(32*i+16+j)} * 2^i \quad (8)$$

where $i$ = 0, 1, 2, 3, 4

As a specific example, when j=15, $U_{15}$ and $V_{15}$ are as follows.

$$U_{15} = k_{(32*4+15)} + *2^4 + k_{(32*3+15)} * 2^3 + k_{(32*2+15)} * \\ 2^2 + k_{(32+15)} * 2^1 + k_{15} \quad (9)$$
$$= k_{143} * 2^4 + k_{111} * 2^3 + k_{79} * 2^2 + k_{47} * 2 + k_{15}$$

$$V_{15} = k_{(32*4+16+15)} + *2^4 + k_{(32*3+16+15)} * 2^3 + k_{(32*2+16+15)} * \\ 2^2 + k_{(32+16+15)} * 2^1 + k_{(16+15)} \quad (10)$$
$$= k_{159} * 2^4 + k_{127} * 2^3 + k_{95} * 2^2 + k_{63} * 2 + k_{31}$$

The values given in (9) and (10) respectively correspond to the patterns (15) and (31) of coefficients. When j=0, $U_0$ and $V_0$ are as follows.

$$U_0 = k_{128} * 2^4 + k_{96} * 2^3 + k_{64} * 2^2 + k_{32} * 2 + k_0$$

$$V_0 = k_{144} * 2^4 + k_{112} * 2^3 + k_{80} * 2^2 + k_{48} * 2 + k_{16}$$

These values correspond to the patterns (0) and (16) of coefficients. While the configuration of the table index generation unit 52 has not been illustrated, this component can be composed of hardware or software for executing the calculations shown as Equations (7) and (8). Such hardware or software can be easily configured by one of skill in the art.

Reading Unit

The reading unit 53 uses the values $U_j$ and $V_j$ received from the table index generation unit 52 to search the table storage unit 51, reads the corresponding values $A(U_j),B(V_j)$ from the table and outputs them to the first calculation unit 54.

First Calculation unit

Whenever a new random number is generated, the first calculation unit 54 uses the values $A(U_j),B(V_j)$ read out from the table to find the multiple kG of a fixed point. This process is shown by the flowchart in FIG. 6. Before describing this process, the calculation method will first be explained. The multiple kG of a fixed point is basically found by multiplying the base point G by each digit in the random number k and then totaling the multiplication results. This is represented by the following Equation (11).

$$kG = k_{159} * 2^{159}G + k_{158} * 2^{158} * G + k_{157} * 2^{157} * G + \quad (11)$$
$$k_{156} * 2^{156} * G + \ldots + k_3 * 2^3 * G + k_2 * 2^2 * G +$$
$$k_1 * 2 * G + k_0 * G$$

The values $A(U_j)$, $B(V_j)$ read out from the table storage unit 51 are given by the following list of equations.

$A(U_j)$
$A(U_{15}) = k_{143} * 2^{143} * G + k_{111} * 2^{111} * G + k_{79} * 2^{79} * G +$
$\quad k_{47} * 2^{47} * G + k_{15} * G$
$A(U_{14}) = k_{142} * 2^{142} * G + k_{110} * 2^{110} * G + k_{78} * 2^{78} * G +$
$\quad k_{46} * 2^{46} * G + k_{14} * G$
$A(U_{13}) = k_{141} * 2^{141} * G + k_{109} * 2^{109} * G + k_{77} * 2^{77} * G +$
$\quad k_{45} * 2^{45} * G + k_{13} * G$
$\vdots$
$A(U_1) = k_{129} * 2^{129} * G + k_{97} * 2^{97} * G + k_{65} * 2^{65} * G +$
$\quad k_{33} * 2^{33} * G + k_1 * G$
$A(U_0) = k_{128} * 2^{128} * G + k_{96} * 2^{96} * G + k_{64} * 2^{64} * G +$
$\quad k_{32} * 2^{32} * G + k_0 * G$ $B(V_j)$
$B(V_{15}) = k_{159} * 2^{159} * G + k_{127} * 2^{127} * G + k_{95} * 2^{95} * G +$
$\quad k_{63} * 2^{63} * G + k_{31} * 2^{31} * G$
$B(V_{14}) = k_{158} * 2^{158} * G + k_{126} * 2^{126} * G + k_{94} * 2^{94} * G +$
$\quad k_{62} * 2^{62} * G + k_{30} * 2^{30} * G$
$B(V_{13}) = k_{157} * 2^{157} * G + k_{125} * 2^{125} * G + k_{93} * 2^{93} * G +$
$\quad k_{61} * 2^{61} * G + k_{29} * 2^{29} * G$
$\vdots$
$B(V_1) = k_{145} * 2^{145} * G + k_{113} * 2^{113} * G + k_{81} * 2^{81} * G +$
$\quad k_{49} * 2^{49} * G + k_{17} * 2^{17} * G$
$B(V_0) = k_{144} * 2^{144} * G + k^{112} * 2^{112} * G + k_{80} + 2^{80} * G +$
$\quad k_{48} * 2^{48} * G + k_{16} * 2^{16} * G$ To find kG using the above values $A(U_j)$, $B(V_j)$, the recurrent formula shown below as Equation (12) is used, considering the differences in digits between the elements.

$$T_{14} = \{A(U_{15}) + B(V_{15})\} * 2 + A(U_{14}) + B(V_{14}) \quad (12)$$
$$T_{13} = T_{14} * 2 + A(U_{13}) + B(V_{13})$$
$$T_{12} = T_{13} * 2 + A(U_{12}) + B(V_{12})$$
$$\vdots$$
$$T_0 = T_1 * 2 + A(U_0) + B(V_0)$$
$$T_0 = kG$$

Figure 6:
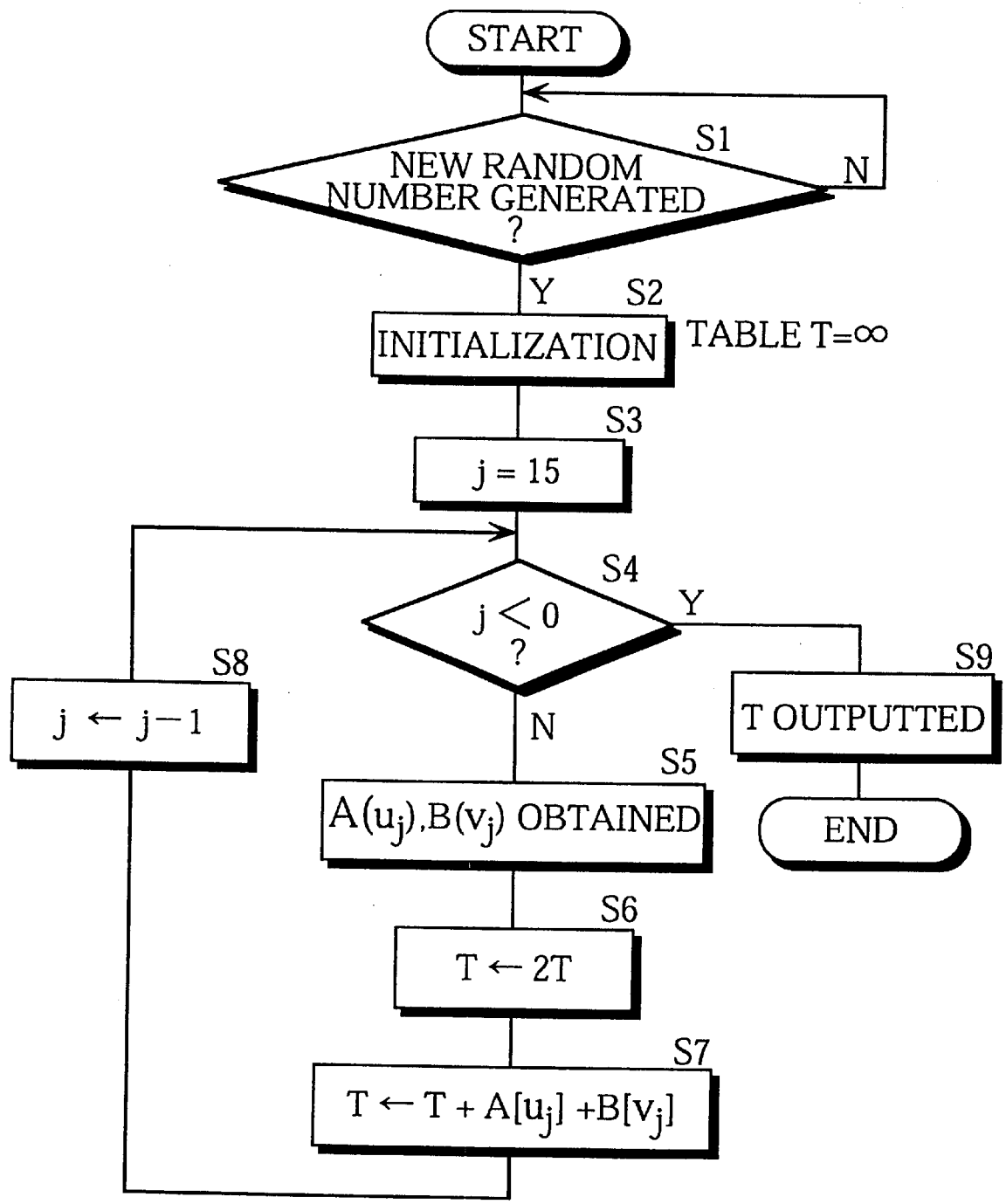
FIG. 6 is a flowchart showing the operation of the first calculation unit shown in FIG. 3.

In the flowchart shown in FIG. 6, step S2 sets T as the zero point ($=\infty$). In step S5, the values $A(U_j)$, $B(V_j)$ are found and read from the table storage unit 51 using the values $U_j$ and $V_j$ received from the table index generation unit 52. The processing in the loop from step S4 to S8 is iterated to execute the recurrent formula shown above. When j is judged to be less than "0" in step S4, the value T at that time will be equal to kG, with this being outputted to the signature generation/verification unit 2 via the output unit 55 (step S9). It should be noted that the decrementing of the value j in steps S3, S4, and 88 is performed by the control unit 56.

Calculation of a Multiple of an Arbitrary Point

The following is an explanation of the calculation of a multiple $r_x Y_a$ of an arbitrary point by the signature generation/verification unit 2. As shown by the block diagram in FIG. 4, the signature generation/verification unit 2 is composed of a transformation unit 21, a window dividing unit 22, a table generating unit 23, a second calculation unit 24, and an output unit 25. The value $r_x$ represents the x component of the data $R_1$ transmitted together with the message m from the device-in-communication when performing ElGamal signed communication. This value $r_x$ is a random number, and since a random number k is multiplied by a public key $Y_a$ when performing encrypted communication, this value $r_x$ will be regarded as the random number k for ease of explanation. Accordingly, the following description focuses on the multiplication $kY_a$ of the random number and the public key by the signature generation/verification unit 2. T is random number k can be a 160-digit binary number as shown by Equation (3).

Transformation Unit

The transformation unit 21 performs an "addition-subtraction" transformation for the random number k. The details of the procedure for an addition-subtraction transformation are shown in the flowcharts in FIGS. 7 and 8, but in short, such transformation involves the transformation of the coefficient series $[k_n, k_{n-1}, k_{n-2}, \ldots k_2, k_1, k_0]$ for the random number k into the coefficient series $T=[t_{n+1}, t_n, t_{n-1}, \ldots t_2, t_1, t_0]$. The method for performing this transformation is shown below.

(1) The random number k is searched starting from the LSB, and a coefficient $k_i=1$.
(2) On finding a bit where $k_i=1$, the coefficient $k_{(i+4)}$ located four bits higher than this bit is analyzed and if $k_{(i+4)}=0$, the coefficients $k_i$ to $k_{(i+4)}$ are set as the coefficients $t_i$ to $t_{(i+4)}$ without amendment. This is shown by Equation (13) below.

$$[t_{(i+3)}, t_{(i+2)}, t_{(i+1)}, t_i] = [k_{(i+3)}, k_{(i+2)}, k_{(i+1)}, k_i] t_{(i+4)} = k_{(i+4)} \quad (13)$$

The same operation is then repeated starting from the (i+5) bit in the direction of the MSB.
(3) If, on the other hand, $k_{(i+4)}=1$, the processing of $k_{(i+3)}$ to $k_i$ is held over and the higher bits are examined starting from the (i+5) bit. The first coefficient that is "0" is set as bit s, with the value $t_s=1$ being set. At the same time, all coefficients from the (s−1) bit to the (i+4) bit are set at zero, so that $$t_{(s-1)} = t_{(s-2)} \cdots t_{(i+4)} = 0$$

The complement of 2 of the binary numbers $[k_{(i+3)}, k_{(i+2)}, k_{(i+1)}, k_i]$ is then found for coefficients $k_{(i+3)}$ to $k_i$.

$$16 - (k_{(i+3)} * 2^3 + k_{(i+2)} * 2^2 + k_{(i+1)} * 2 + k_i) = k_{(i+3)}' * 2^3 + k_{(i+2)}' * 2^2 + k_{(i+1)}' * 2 + k_i' \quad (14)$$

Negative values are found for all these coefficients and the result is set as the t coefficients.

$$[t_{(i+3)}, t_{(i+2)}, t_{(i+1)}, t_i] = [-k_{(i+3)}', -k_{(i+2)}', -k_{(i+1)}', -k_i'] \quad (15)$$

The processing is then repeated starting from the (s+1) bit. By repeating the processing until the MSB is reached, the transformed coefficient series T is obtained.

Figure 9:
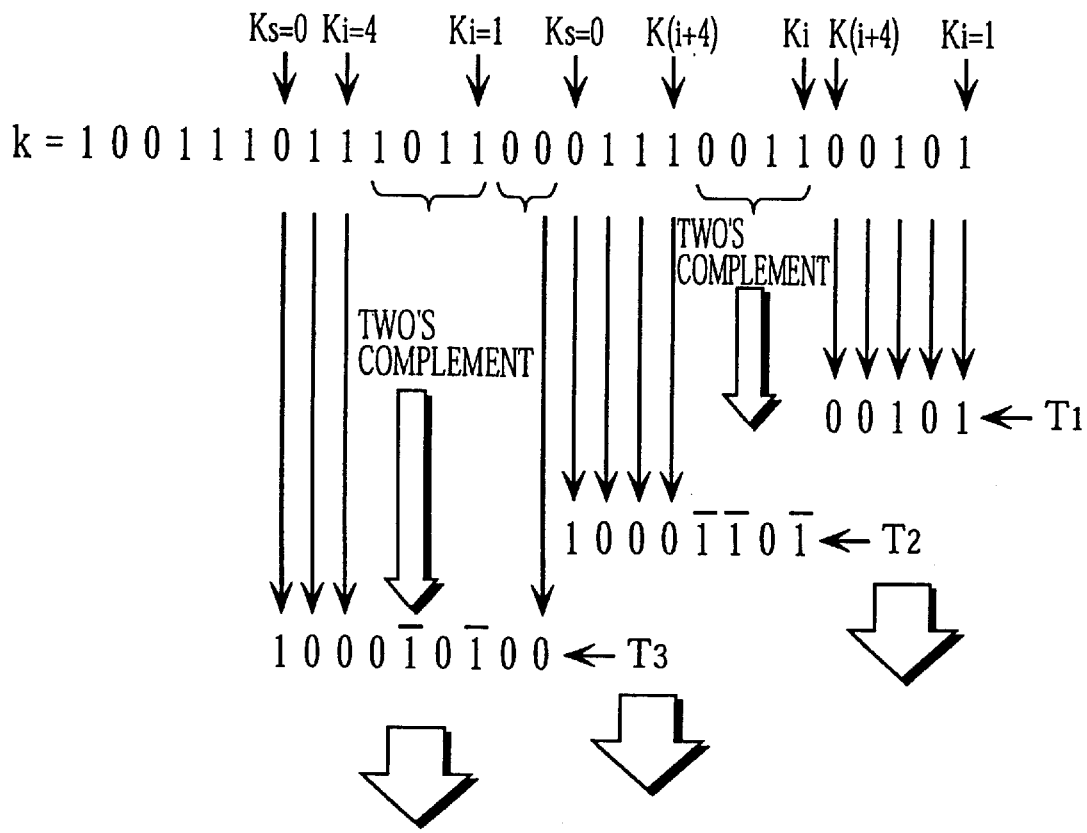
FIG. 9 is a representation of an addition-subtraction transformation operation.
Figure 9:
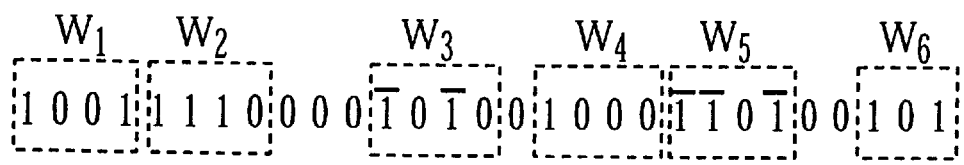

The following is description of the transformation process for the specific example shown in FIG. 9. In FIG. 9, a 28-digit binary number is shown as the random number k. The transformation is performed on this random number k starting from the LSB, and since the value of the LSB is "1" in this example, the LSB is set as the coefficient $k_i$ and the coefficient $k_{(i+4)}$ located 4 bits higher than this bit i is analyzed. In this case, $k_{(i+4)}$=0, so that the coefficients $k_i$ to $k_{(i+4)}$ are set as the coefficients $t_i$ to $t_{(i+4)}$ without amendment. This transformation result for this part of the coefficient series is shown as $T_1$ in FIG. 9.

Next, the processing advances to the (i+5) bit and analyzes whether its value is "0" or "1". In this example, the value of the (i+5) bit is "1", so that this bit is newly set as the i bit, and the coefficient $k_{(i+4)}$ located four bits higher that this new i bit is analyzed. In this case, $k_{(i+4)}$=1, so that the higher bits are analyzed and the first coefficient with the value zero is set as the bit s. In the illustrated example, $k_s$=0 for the bit located three bits higher than the (i+4) bit. As a result, the coefficient for the s bit is set at "1", and the bits (s−1) to (i+4) are set at zero to generate the generated coefficients into $t_s$ to $t_{(i+4)}$. After this, the processing shown in Equations (13) and (14) is performed for $k_{(i+3)}$ to $k_i$ to obtain the result "1101". In this way, the transformation for the s to i bits (the $13^{th}$ to $6^{th}$ bits of the random number k) is completed, with the transformation result for this part of the coefficient series being shown as $T_2$ in FIG. 9.

After this, the above processing is repeated for the higher bits to give the coefficient series $T_3$, with the processing continuing until the MSB of the random number k is reached. At this point, the partial coefficient series $T_1$, $T_2$, $T_3$ . . . are concatenated to give the final transformed coefficient series T.

Figure 7:
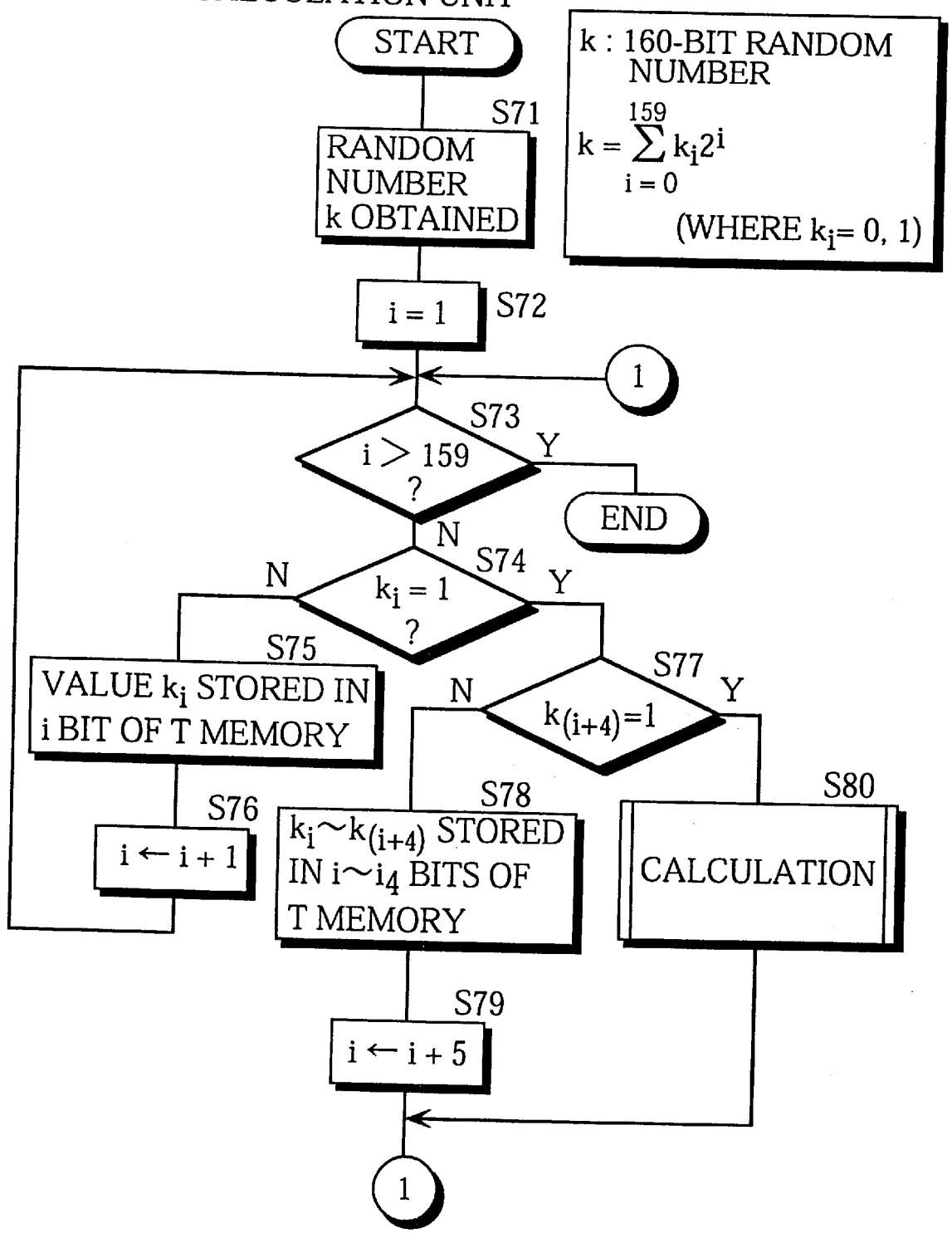
FIGS. 7 and 8 are flowcharts showing the operation of the second calculation unit in FIG. 4.
Figure 8:
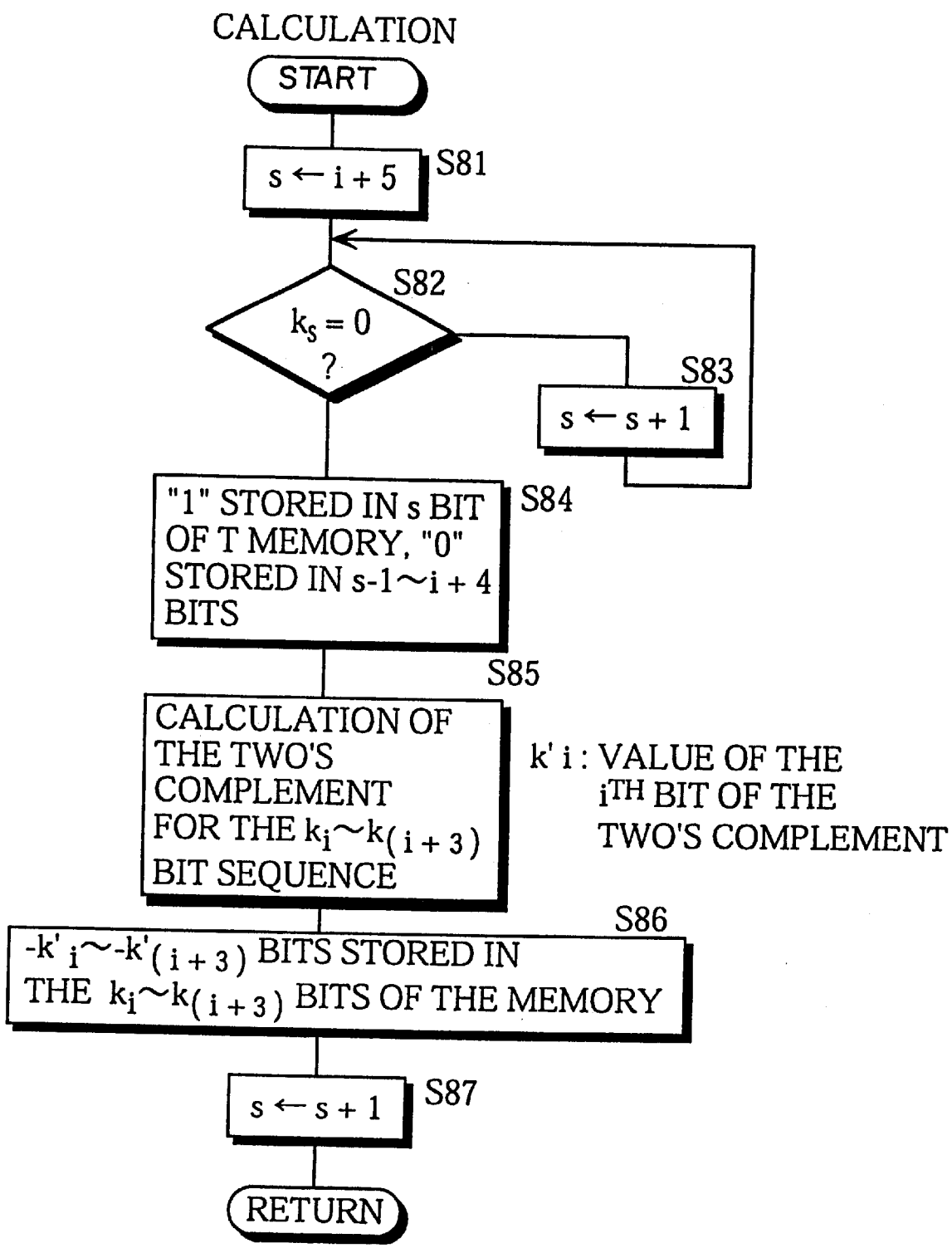

The flowchart in FIG. 7 shows the processing for transforming the coefficient series of the 160-bit random number k. In this flowchart, the variable i given in steps S72 and S76 shows a bit position in the random number k. The expression "T memory" given in steps S75 and S78 meanwhile refers to a memory used for storing the transformed coefficients $t_i$. When it is judged in step S73 that i>159, the values stored in the T memory will be the transformed coefficient series T=[$t_{160}$,$t_{159}$, . . . $t_1$,$t_0$]. As shown in S73→S74→S75→S76→S73 so long as zero bit values continue from the LSB, zeros will be written into corresponding bit positions in the T memory. On the other hand, when a "1" bit value is detected (S74), it is judged in step S77 whether the coefficient located 4 bits higher than this value is also "1". If not, the processing advances through steps S78 and S79 with the coefficients being stored in the T memory without amendment. If the judgement "Yes" is given in step S77, the processing proceeds to the subroutine shown in FIG. 8, and the calculations shown above as Equations (13) and (14) are performed. In step S84 in FIG. 8, the transformation process is performed for the higher bits from the (i+4) bit to the s bit, while in steps S85 and S86, the transformation is performed for the coefficients from the i bit to the (i+3) bit. The processing in the flowcharts in FIGS. 7 and 8 has already been explained, and so will not be dealt with further.

As can be seen from the processing in step S84, the addition-subtraction transformation is such that when many digits in the random number are "1", these will be converted to zeros, thereby reducing the number of coefficients with the value "1". This is of particular importance in the present invention.

Window Dividing Unit

As shown in FIG. 10, the window dividing unit 22 searches the coefficient series T (S102→S103→S104→S105→S103) obtained by the transformation unit 21 (S101) starting from the MSB, and sets a group of four bits starting from the first "1" value to be detected as one window (S106). This processing is repeated (S107) until the LSB is reached. It should be clear here that if a large number of coefficients have the value "0", the number of generated windows will be very small. Also, since the number of "1" coefficients is reduced by the addition-subtraction transformation, the present method is able to minimize the number of windows by performing the addition-subtraction transformation before the division into windows.

An example result of division into windows for the coefficient series T after addition-subtraction transformation is shown at the foot of FIG. 9. As can be readily understood, the number of windows has been reduced compared with conventional techniques.

Table Generating Unit

On receiving the public key $Y_a$, the table generating unit 23 calculates odd-number multiples of the public key $Y_a$. Since the size of each window is 4 bits (so that the maximum value in base 10 is "15"), "*15" is set at the highest odd number multiple. The generated table is shown in FIG. 11

Second Calculation unit

The second calculation unit 24 searches the transformed coefficient series T starting from the MSB, adds a value given by the table for each window, and then multiplies the result by "2". This procedure is shown in detail in FIG. 12. The first window is set as the processing target in step S121, and the four bits inside the first window are analyzed in step S122. In step S123, bits with the value "1" are extracted starting from the highest of the four bits. As one example, if the value of the four bits is "1100", the value "11" is extracted, while when the value of the four bits is "1010", the value "101" is extracted. Here, the extracted bit sequence will definitely be an odd number which in decimal notation is "15" or less. The generated table is then referenced using the extracted bit sequence and the value $sY_a$ is obtained (S124). The processing then proceeds to S125. In step S121, the value Z is cleared to zero for the first window, so that in this first execution of S125 the value $sY_a$ is stored into the memory Z. Following this, the number of zero coefficients between the lowest bit in the extracted bit sequence and the highest bit in the second window is detected and set as the value m (S127).

The processing target is then set as the second window (S128), and as before coefficients with the value "1" are detected starting from the highest of the four bits in the window (S124). The processing then proceeds to the calculation in step S125. In this case, the calculation result for the first window will have been stored in the Z memory and the value m will have been set in the preceding execution of step S127. Accordingly, the stored value of the Z memory is updated as shown below.

$$Z=(sY_a)w_1*2^m+(sY_a)w_2$$

where $(sY_a)w_1$ is the value obtained from the table when processing the first window and $(sY_a)w_2$ is the value obtained from the table when processing the second window.

The processing in steps S122 to S128 is repeated for the third and fourth windows and once the processing has been repeated for all of the windows, the processing advances to step S130. Here, the number of "0" coefficients following the lowest bit in the final window $W_{max}$ is detected as the variable n. The value stored in the Z memory at that point is then multiplied by $2^n$ to give the final stored value of the Z memory. This final value stored in the Z memory is set as the multiple $kY_a$ of the arbitrary point.

The above embodiment represents but one example of the present invention which should not be construed as being limited to this example. The following are seven examples of modifications that can be made to the above embodiment.

(1) When calculating a multiple of a fixed point, A(s) and B(s) stored in the table storage unit are totals of one-word multiples where one word is set at 32 bits, with the table index generation unit extracting coefficients from the random number one word (32 bits) at a time. However, one word is not limited to 32 bits, and so may be set at 16 bits or 64 bits. That said however, when the random number is 160 bits long, the setting of one word at 32 bits is suitable when considering the number of bits used for the index address and the values of the totals of the multiples.

2. In the above embodiment, the calculation of a multiple of a fixed point is found using two kinds, A(s) and B(s), of totals for multiple values, although three or more kinds may equally be used. When doing so, the number of bits in one word may be divided by the number of kinds of totals, one of these totals may be set as the "standard total", and the remaining totals may be set as equating to a part of the multiple at a bit position which is shifted an appropriate number of bits from the standard total.

3. Alternatively, the multiple may be calculated using only one kind of total, A(s). When doing so, the value $2^{16}*A(s)$ fl is calculated to shift the value A(s) by sixteen bits, with the result being used in place of B(s) in the calculation shown as Equation (12).

4. When dividing into windows as part of the calculation of a multiple of an arbitrary point, each window was set as being four bits long, although this window size is of no particular importance. It should be obvious that 8-bit windows or 16-bit windows can equally be used.

5. The above embodiment deals with the case where present invention is adapted to an apparatus performing ElGamal-signed communication, although it may equally be adapted to encrypted communication and in particular to encrypted communication that uses elliptic curves.

6. The base point G was described as an element in the order q of the elliptic curve E(GF(p)) in the embodiment, although it is also possible to use an element in an order of an elliptic curve E(GF(p$^r$)) in an extended field, r being a positive integer. In the same way, when calculating a multiple of an arbitrary point, the elliptic curve E(GF(p$^r$)) in the extended field may be used in place of the normal elliptic curve E(GF(p)).

7. When calculating a multiple of an arbitrary point, a combination of addition and multiplication using a power of "2" were used although a combination of addition, multiplication by "2", and multiplication by "4" may be used. When doing so, multiplication by "4" can be achieved by a polynomial using projective coordinates.

Although the present invention has been fully described by way of examples with reference to accompanying drawings, it is to be noted that various changes and modifications will be apparent to those skilled in the art Therefore, unless such changes and modifications depart from the scope of the present invention, they should be construed as being included therein.

What is claimed is:

1. An elliptic curve calculation apparatus for calculating a multiple kG, p and q being prime numbers, E(GF(p)) being an elliptic curve over a finite field GF(p), G being a base point which is an element with an order q in E(GF(p)), p being t words long, and k being a positive integer whose number of digits is no less than n words (where n≧1), the elliptic curve calculation apparatus comprising:

a first table for storing multiples of the base point G and figures produced by combining digits located at one word intervals in a binary number with the same number of digits as k;

a second table for storing multiples of the base point G and figures produced by combining digits located at one word intervals in the binary number, the second table storing multiples of different combinations of digits in the binary number to the first table; and calculation means for calculating the multiple kG of the base point G by repeating a process where multiples stored in the first table and the second table are added and multiplied by two.

2. The elliptic curve calculation apparatus of claim 1, wherein the multiples stored in the first table are for digits in the integer k that are located ½ word from the digits in the integer k whose multiples are stored in the second table.

3. The elliptic curve calculation apparatus of claim 2, wherein the calculation means includes a first address generating unit and a second address generating unit, the first and second address generating units receiving a new positive integer k from the calculation means, referring to a sequence of digits in the integer k and generating an address for referring to the first table and the second table, respectively.

4. The elliptic curve calculation apparatus of claim 3, wherein the first and second address generating units detect digits located at word intervals in the integer k and generate addresses from the detected digits, the first address generating unit detecting digits in the integer k that are located ½ word from the digits detected by the second address generating unit.

5. The elliptic curve calculation apparatus of claim 4, wherein the first address generating unit detects a first combination of digits at word intervals which includes a most significant bit of integer k, the first address generating unit thereafter detecting a combination of digits which are shifted by one each time and finally detecting a combination of digits which are located just before halfway points of the word unit.

6. The elliptic curve calculation apparatus of claim 5, wherein the calculation means also includes a reading unit, the reading unit using the addresses generated by the first address generating unit and the second address generating unit to refer to the first table and the second table, and reading values stored at the generated addresses, the calculation means repeatedly performing:

a first calculation that finds a total of a stored value in the first table and a stored value in the second table that have been read by the reading unit;

a second calculation that doubles a calculation result of the first calculation; and a third calculation that adds a calculation result of the second calculation to a calculation result of the first calculation for stored values that have been newly read by the reading unit from the first table and the second table, wherein the values in the first and second tables, the positive integer k, and the base point G are all expressed in binary.

7. A communication terminal that performs public key encryption with another communication terminal, the communication terminal being connected to a center via a network and including a random number generation means for generating a random number k and an elliptic curve calculation apparatus for calculating a multiple kG of an element G, where a a prime number p, an elliptic curve E(GF(p)) over a finite field GF(p), the element G with order q of E(GF(p)), and a public key $Y_a$ are revealed by the center as system parameters, the elliptic curve calculation apparatus comprising:
a first table for storing multiples or the base point G and figures produced by combining digits located at one word intervals in a binary number with the same number of digits as k;
a second table for storing multiples of the base point G and figures produced by combining digits located at one word intervals in the binary number, the second table storing multiples of different combinations of digits in the binary number to the first table; and
calculation means for calculating the multiple kG of the base point G by repeating a process where multiples stored in the first table and the second table are added and multiplied by two.

8. The communication terminal of claim 7,
wherein the multiples stored in the first table are for digits in the random number k that are located ½ word from the digits in the random number k whose multiples are stored in the second table.

9. The communication terminal of claim 8,
wherein the calculation means includes a first address generating unit and a second address generating unit,
the first and second address generating units receiving a new random number k from the calculation means, referring to a sequence of digits in the random number k and generating an address for referring to the first table and the second table, respectively.

10. The communication terminal of claim 9,
wherein the first and second address generating units detect digits located at word intervals in the random number k and generate addresses from the detected digits,
the first address generating unit detecting digits in the integer k that are located ½ word from the digits detected by the second address generating unit.

11. The communication terminal of claim 10,
wherein the first address generating unit detects a first combination of digits at word intervals which includes a most significant bit of random number k the first address generating unit thereafter detecting a combination of digits which are shifted by one each time and finally detecting a combination of digits which are located just before halfway a points of the word unit.

12. The communication terminal of claim 11,
wherein the calculation means also includes a reading unit, the reading unit using the addresses generated by the first address generating unit and the second address generating unit to refer to the first table and the second table, and reading values stored at the generated addresses, the calculation means repeatedly performing:
a first calculation that finds a total of a stored value in the first table and a stored value in the second table that have been read by the reading means;
a second calculation that doubles a calculation result of the first calculation; and
a third calculation that adds a calculation result of the second calculation to a calculation result of the first calculation for stored values that have been newly read by the reading unit from the first table and the second table,
wherein the values in the first and second tables, the random number k, and the base point G are all expressed in binary.

13. An elliptic curve calculation apparatus for calculating a multiple kG, p and q being prime numbers, E(GF(p)) being an elliptic curve in a finite field GF(p), G being a base point which is an element in an order q of E(GF(p)), p being t words long, and k being a positive integer whose number of digits is no less than n words (where n≧1), the elliptic curve calculation apparatus comprising:
a table for storing multiples of the base point G and figures produced by combining digits located at word intervals in a binary number with the same number of digits as the integer k;
referencing means for referring to the integer k and generating an address for indexing the table;
first calculation means for reading a first value from the table using the generated address and for multiplying the read first value by a power of two, wherein the power of two equates to a number of digits in half a word;
second calculation means for finding a sum of a second value that is a calculation result of the first calculation means and a third value read from the table using an address newly generated by the referencing means;
third calculation means for multiplying a calculation result of the second calculation means by a power of two, the power of two depending on a digit position within the integer k; and
control means for having the first to third calculation means repeatedly perform calculation until every digit in the integer k has been used in calculation,
wherein the integer k and the element G are both binary numbers.

14. An elliptic curve calculation apparatus for calculating a multiple kP of an arbitrary point P on an elliptic curve E, p and q being prime numbers, E(GF(p)) being an elliptic curve in a finite field GF(p), G being a base point which is an element in an order q of E(GF(p)), p being n bits long, and k being a positive prime number whose number of digits is large, the elliptic curve calculation apparatus calculating the multiple kP of the arbitrary point P using a combination of an addition-subtraction transformation method and a window method, and the elliptic curve calculation apparatus comprising:
coefficient detecting means for analyzing, when the positive integer k is expressed in binary as $$k=k_0+k_1*2+k_2*2^2+\ldots+k_{n-1}2^{n-1} \text{(where } k_0 \ldots k_{n-1}=0 \text{ or } 1)$$

every bit in the positive integer k starting from a least significant bit and extracting each bit where $k_i=1$;

coefficient transforming means for analyzing, when a bit where $k_i=1$ has been extracted and a coefficient $k_{(i+m)}$ for an (i+m) bit has a value "1", higher coefficients starting from an (i+m+1) bit and, on finding a bit s where $k_s=0$, generating transformed values $t_s=1, t_{s-1}=0, \ldots t_{(i+m+1)}=0$ where coefficients $k_{(i+m+1)}$ to $k_s$ are inverted;

surplus adjustment means for adjusting, when the coefficients between the s bit and the i+m+1 bit have been transformed by the coefficient transformation means, a surplus added when the coefficients between the s bit and the i+m+1 bit were transformed, thereby converting $k_i$ to $k_{(i+m+1)}$ into transformed values $t_i$ to $t_{(i+m)}$;

value maintaining means for setting, when a bit where $k_i=1$ has been extracted and $k_{(i+m)}$ has a value "0", $k_i \sim k_{i+m}$ as transformed values $t_i \sim t_{i+m}$ without amendment; and repetition indicating means for having the coefficient detecting means perform a detecting operation (1) for higher bits starting from an s+1 bit when the surplus adjustment means has adjusted a surplus and (2) for higher bits starting from an i+m+1 bit when the value maintaining means has set $k_i \sim k_{i+m}$ as $t_i \sim t_{i+m}$, before in either case activating every means in the elliptic curve calculation apparatus.

15. The elliptic curve calculation apparatus of claim 14, where m is equal to a number of bits in one window used in the window method.

16. The elliptic curve calculation apparatus of claim 15, wherein m is "4".

17. An elliptic curve calculation apparatus for calculating a multiple kP of an arbitrary point P on an elliptic curve E, p and q being prime numbers, E(GF(p)) being an elliptic curve in a finite field GF (p), G being a base point which is an element in an order q of E(GF(p)), p being n bits long, and k being a positive prime number whose number of digits is large, the elliptic curve calculation apparatus comprising:
addition-substitution transformation means for analyzing, when the positive integer k is expressed in binary as $$k=k_0+k_1*2+k_2*2^2+\ldots+k_{n-1}2^{n-1} \text{ (where } k_0 \ldots k_{n-1}=0 \text{ or } 1)$$

every bit in the positive integer k starting from a least significant bit and, when a bit where $k_i=1$ has been extracted and a coefficient $k_{(i+m)}$ for an (i+m) bit (m being a positive integer) has a value "1", analyzing higher coefficients starting from an (i+m+1) bit and, on finding a bit s where $k_s=0$, generating transformed values $t_s=1, t_{s-1}=0, \ldots t_{(i+m+1)}=0$ where coefficients $k_{(i+m+1)}$ to ks are inverted, while adjusting a surplus value added when the coefficients between the s bit and the i+m+1 bit were transformed to produce transformed values $t_i$ to $t_{(i+m)}$ from $k_i$ to $k_{(i+m)}$;

window dividing means for dividing, after all bits in the positive integer k have been subjected to transformation by the addition-substitution transformation means to produce a transformed numerical string, the transformed numerical string into m-bit windows;

a provisional calculation table storing multiples of s (where s=3,5, ... (2m−1)) and the arbitrary point P; and multiplying means for searching the provisional calculation table using a binary number in a window to obtain a value sp, for adding the value sp to a provisional total $S_a$, and for multiplying the provisional total $S_a$ by an appropriate power of two before adding a next value sp, wherein the multiple kp of the arbitrary point P is found as the provisional total $S_a$ when every window has been processed by the multiplying means.

18. The elliptic curve calculation apparatus of claim 17, wherein m=4.

* * * * *

UNITED STATES PATENT AND TRADEMARK OFFICE
CERTIFICATE OF CORRECTION

PATENT NO. : 6,263,081 B1
DATED : July 17, 2001
INVENTOR(S) : Atsuko Miyaji and Takatoshi Ono It is certified that error appears in the above-identified patent and that said Letters Patent is hereby corrected as shown below:

Column 1,
Line 52, delete "Elsamal" and insert -- ElGamal --.

Column 2,
Line 1, delete "(42)" and insert -- (2) --.
Line 33, delete "$G_i=(16^1)G$" and insert -- $G_i=(16^i)G$ --.
Line 56, delete "in".

Column 3,
Line 65, delete ";" and insert -- : --.

Column 5,
Line 8, delete "E(GFPp))" and insert -- E(GF(p)) --.
Line 50, delete "<a" and insert -- s --.
Line 53, delete "a" and insert -- s --.
Line 60, delete ":" and insert -- ; --.

Column 6,
Line 1, after "window" insert -- , --.
Line 6, delete "G" and insert -- E --.
Line 8, delete "GP(p)" and insert -- GF(p) --.
Line 24, delete "$t_1$" and insert -- $t_i$ --.
Line 33, delete "value sp" and insert -- value sP --.
Line 35, delete "value sp" and insert -- value sP --.

Column 8,
Line 4, delete "a" and insert -- m --.
Line 31, delete "fl".

Column 9,
Line 5, delete "a" and insert -- s --.
Line 45, delete "$k_{)16+128)}*2^{(16+129)}$" and insert -- $k_{(16+128)}*2^{(16+128)}$ --.
Line 56, delete "$a_3*2^{(16+32*3)}*G+a_3*2^{(16+32*4)}*G$" and insert -- $a_3*2^{(16+32*3)}*G+a_4*2^{(16+32*4)}*G$ --.

Column 10,
Line 37, delete "$2^2+k_{(32+16+15)}*2^1+k_{(16+15)}$" and insert -- $2^2+k_{(32+16+15)}*2+k_{(16+15)}$ --.

UNITED STATES PATENT AND TRADEMARK OFFICE
CERTIFICATE OF CORRECTION

PATENT NO. : 6,263,081 B1
DATED : July 17, 2001
INVENTOR(S) : Atsuko Miyaji and Takatoshi Ono It is certified that error appears in the above-identified patent and that said Letters Patent is hereby corrected as shown below:

Column 15,
Line 34, delete "fl".
Line 64, after "art" insert -- . --.

Column 17,
Line 16, delete "a",
Line 17, after "E(GF(p)" insert -- ) --.
Line 60, after "k" insert -- , --.
Line 64, delete "a".

Column 19,
Line 15, delete "$k_{(i+m+1)}$)" and insert -- $k_{(i+m+1)}$ --.
Line 22, delete "$t_{(i+m)}$)" and insert -- $t_{(i+m)}$ --.

Column 20,
Line 33, delete " a value sp" and insert -- a value sP --.
Line 33, delete "the value sp" and insert -- the value sP --.
Line 36, delete "the next value sp" and insert -- next value sP --.
Line 37, delete "multiple kp" and insert -- multiple kP --.

Signed and Sealed this

Twenty-eighth Day of May, 2002

*Attest:*

JAMES E. ROGAN
*Director of the United States Patent and Trademark Office*

*Attesting Officer*